United States Patent
Ramond et al.

(10) Patent No.: US 10,704,940 B2
(45) Date of Patent: Jul. 7, 2020

(54) BODY FOR MOUNTING ULTRASONIC TRANSDUCER IN A FLOWMETER PIPING THROUGH AN OPENING ACCORDING TO A CONTOUR LINE TO PREVENT TURBULENCES

(71) Applicant: INTEGRA METERING SAS, Blagnac (FR)

(72) Inventors: Alain Ramond, Toulouse (FR); Mathieu Poque, Villefranche-de-Lauragais (FR)

(73) Assignee: INTEGRA METERING SAS, Blagnac (FR)

( * ) Notice: Subject to any disclaimer, the term of this patent is extended or adjusted under 35 U.S.C. 154(b) by 56 days.

(21) Appl. No.: 16/072,419

(22) PCT Filed: Jan. 24, 2017

(86) PCT No.: PCT/FR2017/050143
§ 371 (c)(1),
(2) Date: Jul. 24, 2018

(87) PCT Pub. No.: WO2017/129888
PCT Pub. Date: Aug. 3, 2017

(65) Prior Publication Data
US 2019/0033106 A1   Jan. 31, 2019

(30) Foreign Application Priority Data

Jan. 25, 2016 (FR) ..................... 16 50565

(51) Int. Cl.
*G01F 1/66* (2006.01)
*G01F 15/18* (2006.01)

(52) U.S. Cl.
CPC ............ *G01F 1/662* (2013.01); *G01F 15/185* (2013.01)

(58) Field of Classification Search
None
See application file for complete search history.

(56) References Cited

U.S. PATENT DOCUMENTS 3,817,098 A   6/1974   Brown
4,375,767 A   3/1983   Magori
(Continued)

FOREIGN PATENT DOCUMENTS

EP   2 333 495 A1   6/2011
GB   2101318 A      1/1983

OTHER PUBLICATIONS

International Search Report, dated Jun. 26, 2017, from corresponding PCT application No. PCT/FR2017/050143.

*Primary Examiner* — Harshad R Patel
(74) *Attorney, Agent, or Firm* — Ipsilon USA, LLP

(57) ABSTRACT

Disclosed is a device for mounting an ultrasonic transducer, suitable for mounting the transducer such that it extends through a wall of a flow meter having a channel in which a fluid flows; the device includes a body in communication with an inner surface of the channel in accordance with a closed contour line that forms an interface between the inner surface of the channel and a surface of the device body, referred to as active surface, which follows the shape of the inner surface of the channel. The active surface extends continuously, and without openings, in the area delimited by the contour line. Also disclosed is a flow meter using a mounting device of this kind.

20 Claims, 3 Drawing Sheets

(56) References Cited

U.S. PATENT DOCUMENTS

Figure 1:
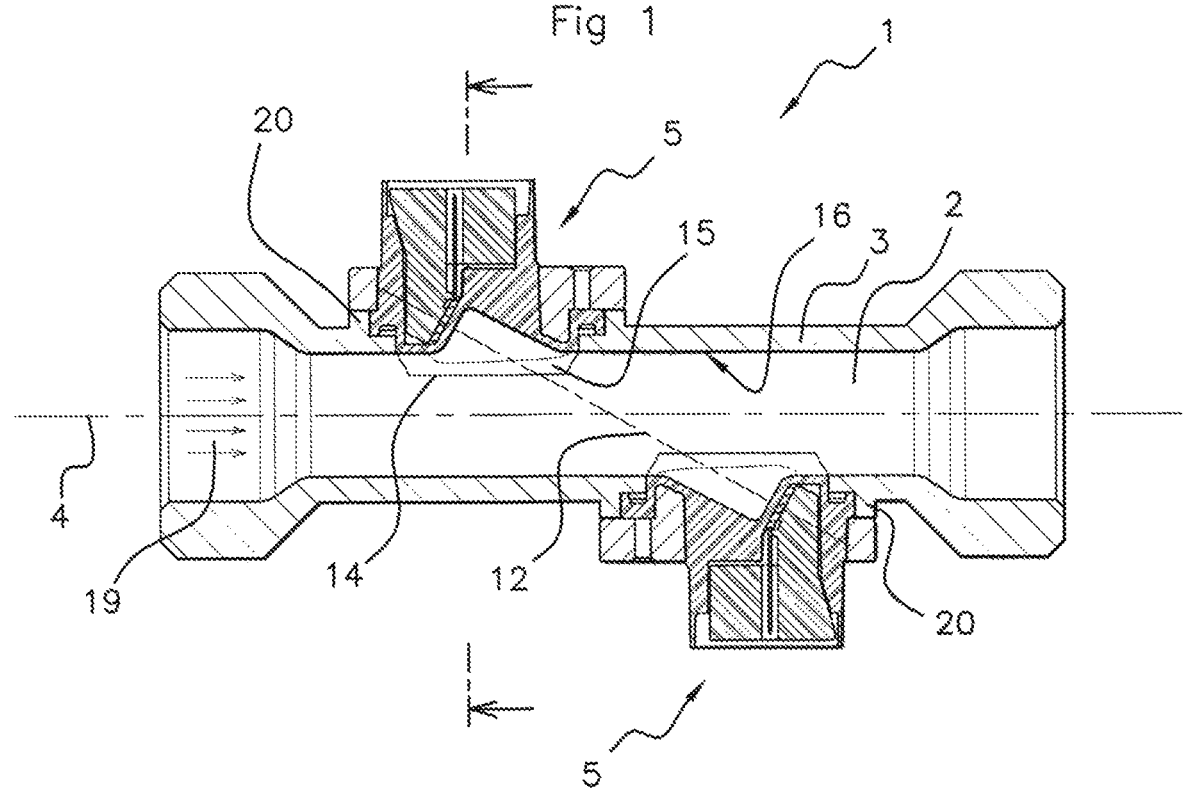

| | | | |
|---|---|---|---|
| 4,754,650 A * | 7/1988 | Smalling | G01F 1/662 |
| | | | 73/861.28 |
| 5,531,124 A | 7/1996 | Kim et al. | |
| 5,905,207 A | 5/1999 | Schalk | |
| 2015/0211905 A1 * | 7/2015 | Drachmann | G01F 1/662 |
| | | | 73/861.28 |

* cited by examiner

BODY FOR MOUNTING ULTRASONIC TRANSDUCER IN A FLOWMETER PIPING THROUGH AN OPENING ACCORDING TO A CONTOUR LINE TO PREVENT TURBULENCES

The invention relates to a device for mounting an ultrasonic transducer, and more particularly such a device adapted for mounting said transducer in piping of a flowmeter. The invention likewise relates to flowmeters provided with such mounting devices.

There are numerous types of ultrasonic flowmeters, in which the flow rate of a fluid is measured by the propagation rate of ultrasound in the fluid media flowing in piping.

The present invention can be applied to flowmeters in which the transducer, or at least its mounting device, passes through the wall of the piping to come into contact with the fluid of which the flow rate is to be measured, in contrast to flowmeters in which the transducers and/or their mounting device is installed outside of the piping and for which the measurement is effected by transmitting waves through the walls thereof.

There is known, for example from U.S. Pat. No. 5,531,124, in particular FIGS. 9 and 10, an ultrasonic flowmeter in which the transducers are mounted facing each other in holes pierced diagonally in the wall of the piping. However, in addition to the cost and difficulty in performing such diagonal piercing with the required precision, in particular in a material such as stainless steel, the positioning of the transducer, with or without a mounting device, has numerous disadvantages. In fact, if the transducer is inserted in the hole without extending into the interior of the piping, there is formed—owing to the inclination—a cavity in front of the transducer which is the main area of turbulence and/or stagnation zones of the fluid which disrupt the measurement and can generate clogging in front of the transducers. U.S. Pat. No. 5,531,124 likewise proposes the filling of this cavity using a resin plug having a permeability with respect to ultrasounds similar to that of the fluid to be measured. However, such a plug causes an attenuation of the signal which has to be compensated for. Furthermore, the face in contact with the fluid is inclined with respect to the measuring axis, which can cause other measuring errors, for example caused by refraction phenomena. In addition, such a plug is difficult to produce such that it does not protrude or is not set back in the fluid passage.

EP 2 333 495 proposes an ultrasonic flowmeter in which the transducers are mounted in a "connection piece" fixed to the piping of the flowmeter. This connection piece solves some problem of turbulence around the junction with the piping by proposing a surface having a geometry substantially identical to that of the inner surface of the piping of the flowmeter, with the exception of an opening leading to the transducer. The transducer is mounted in this opening via the interior of the connection piece, prior to fixing to the piping. In addition to the already-mentioned problem of turbulence zones and stagnation zones of the fluid in the vicinity of the transducer, such mounting has the disadvantage of leaving the transducer in contact with the fluid flowing in the piping and of being very difficult to maintain, particularly when the connection piece is welded to the piping.

There is also known from U.S. Pat. Nos. 3,817,098 or 5,905,207 a flowmeter, more particularly adapted for precisely measuring low flow rates, which has two transducers facing each other on a longitudinal axis of piping, each transducer being placed in a flow-calming chamber at each end of the piping section in which the measurement is performed. However, the production of such flow-calming chambers, as well as the installation of the transducers facing each other, has numerous difficulties, for example associated with the machining of the chambers.

The invention thus aims to provide a device for mounting an ultrasonic transducer which permits easy mounting of the transducer whilst minimising possible disruptions to the flow of fluid.

The invention likewise proposes such a mounting device which allows the geometry of the surrounding area of the transducer to be controlled so as to manage the flow states of the fluid around the transducer.

The invention also proposes such a mounting device which minimises the necessary angular adjustments to ensure that the transducers are well aligned.

The invention further proposes such a mounting device allowing the piping to have internal shapes which are difficult to achieve otherwise.

The invention also proposes such a mounting device which allows high pressures in the measuring fluid to be tolerated.

The invention further proposes such a mounting device which permits simplified machining of the mounting apertures of the device on the wall of the piping, despite the possible presence of obstacles such as connecting flanges of the piping.

The invention likewise proposes such a mounting device allowing substantial savings to be made in terms of material and machining of the flowmeter.

In the present document, the terms "inner/interior" or "outer/exterior" are used in relation to the piping passing through the flowmeter. Therefore, the inner surface of the piping is the surface in contact with the fluid which passes therethrough. Similarly, a housing opening to the exterior of the piping is a housing of which the opening is not in contact with the fluid which passes through the piping.

To achieve the aims of the invention, the invention relates to a device for mounting an ultrasonic transducer adapted for mounting said transducer through a wall of a flowmeter having piping within which a fluid flows, said device having a body adapted to emerge onto an inner surface of said piping via an aperture along a contour line forming an interface between said inner surface of the piping and a surface of the body in contact with the fluid flowing in the piping, such that any straight line orthogonal to the contour line and tangential to the inner surface of the piping at a point of the contour line is likewise tangential to said surface of the device at this point, characterised in that the device has a surface, named active surface, in contact with the fluid flowing in the piping, and in that this active surface is formed by said surface of the body in contact with the fluid flowing in the piping.

Owing to this arrangement, the entire surface of the mounting device in contact with the fluid flowing in the piping is formed by the active surface of the body. There is thus no hole, cut or discontinuity in this active surface which may cause turbulence in the fluid flow. Furthermore, since this surface can be formed in a single piece with the body of the device, e.g. by moulding, the shape of this surface can be fully controlled. Moreover, since the active surface is continuous, there can be no problems with sealing the mounting device, except for the interface between this device and the piping. However, this interface itself is perfectly smooth and does not have any unevenness and/or any discontinuity which could be the cause of turbulence. Furthermore, the active surface is free of holes allowing the insertion of the transducer and resulting in sharp edges at the interface between the transducer and the active surface as well as in sealing problems.

Sealing of a flowmeter provided with such mounting devices is therefore improved. Furthermore, the size of the active surface of the mounting device can be relatively high which in fact minimises the amount of material, in general brass or stainless steel, used for the walls of the piping.

Advantageously and in accordance with the invention, said active surface is at least partially formed by a wall of the body having a supporting face bearing the transducer opposite the active surface. The transducer is thus placed opposite the active surface, sheltered from the fluid flowing in the piping. Based on the material used, the wall of the body interposed between the transducer and the fluid can advantageously be sized in terms of thickness so as to match the acoustic impedance between the transducer and the fluid. It can thus be envisaged to use a naked piezoelectric plate directly in place of a coated transducer and thus to produce, with the body, a more economical integrated transducer.

Advantageously and in accordance with the invention, said active surface is free of sharp edges. By forming the active surface with rounded surfaces, fillets in place of sharp angles, etc. to the interface between the active surface and the inner surface of the piping, the path of the fluid flow lines is controlled and allows a flow without any stagnation zones for the fluid.

Advantageously and in accordance with the invention, the transducer is mounted in the body so as to have an ultrasound-transmitting/receiving direction passing through a planar face, named active face, of the active surface. Preferably, the active face is in parallel with the supporting face. Therefore, the transmitting/receiving direction of the transducer is normal to the supporting face and to the active face. Consequently, the transmitting/receiving direction of the transducer can be fixed by design owing to the orientation of the wall of the body.

In accordance with a first advantageous embodiment of the invention, the mounting device is adapted for orienting the transmitting/receiving direction of the transducer in a direction, named measuring direction, adapted for extending in a plane of longitudinal symmetry of the piping and for forming a predetermined angle with a longitudinal axis thereof. This embodiment is particularly suitable for producing flowmeters having two transducers facing each other on a diagonal of the piping for measuring a direct flow rate. It can also be used for flowmeters in which the measurement is performed by reflection of ultrasonic waves on an inner surface of the piping, e.g. in a V-shaped or W-shaped path.

Advantageously and in accordance with the invention, said active surface has a countersunk recess extending in a longitudinal direction, adapted to be in parallel with a longitudinal axis of the piping when the mounting device is mounted thereon. One of the walls of the recess is the wall defined by the supporting face and the active face so as to define the predetermined orientation angle of the measuring direction. Therefore, the ultrasonic waves are transmitted and/or received directly in the measuring direction, without disruptions associated with possible erroneous piercing angles affecting the angle of incidence of the waves. The shape and depth of the recess are adapted so as not to cause turbulence or stagnation of the fluid flow lines.

In particular and to this end, the profile of the recess is such that any plane orthogonal to this longitudinal direction cuts the active surface in a single line. Therefore, there cannot be any set-back portion, i.e. a portion forming a fluid path having a flow return or flow turnaround which would cause a stagnation zone likely to allow deposits of impurities or proliferations of bacteria in the case of a flowmeter for measuring a flow rate of drinking water. Therefore, a flowmeter using such a device for mounting a transducer is more sanitary and does not cause the quality of the fluid passing therethrough to deteriorate.

Advantageously and in accordance with the invention, the active surface has, close to said active face, raised areas adapted to modify a flow of the fluid. Therefore, the presence of longitudinal striations or fin shapes placed at the connection of the active face with the active surface upstream of the active face, in the fluid flow, can contribute to straightening out this flow in particularly turbulent flow states.

Advantageously and in accordance with the invention, the body of the device has, at right angles to the supporting face, an open housing having a concavity oriented opposite the longitudinal axis of the piping. Owing to this housing and to its supporting face, it is easy to place the ultrasonic transducer sheltered from the fluid on the one hand and in an optimum position for transmitting and/or receiving the ultrasonic waves. Moreover, when the body of the mounting device is formed of injected synthetic material, the wall thickness between the supporting face and the active face can be optimised to be matched to the wavelength of the ultrasounds and to minimise possible attenuation of the waves.

Advantageously and in accordance with the invention, the mounting device further has a stopper adapted to co-operate with said housing so as to place the ultrasonic transducer against the supporting face. This stopper can comprise a planar face, in parallel with the supporting face of the housing, adapted to exert pressure on the transducer when the stopper is fixed in the housing. Moreover, the stopper can comprise one or more dimples provided with conductive contacts adapted to be connected to the terminals of the transducer on the one hand and to act as pins for connection to an external electronic device.

Advantageously and in accordance with the invention, the mounting device is adapted to be mounted in the piping in a direction orthogonal to a longitudinal axis thereof. Since the orientation of the transducer can be fixed by the body of the mounting device, it is possible and advantageous to arrange the mounting device such that it can be introduced radially into the piping and fixed thereto, without having to produce oblique piercing in the piping. In this manner, machining stresses on the piping are reduced and the cost is thereby reduced. Moreover, the precision of the position of the transducer is improved.

Advantageously and in accordance with the invention, the mounting device further has a flange adapted to fix the body to said piping, said flange having, facing the body, a protrusion in the form of a U-clamp adapted to co-operate with a conjugate shape of the body so as to stiffen the body. The protrusion in the form of a U-clamp of the flange comes to be housed in a complementary shape provided in the body of the mounting device and allows the body to be reinforced so as to be able to tolerate fluids under high pressure without being deformed.

The invention likewise relates to an ultrasonic flowmeter of the type comprising piping for measuring the flow rate of a fluid and at least two ultrasonic transducers mounted facing each other through a wall of said piping in a single longitudinal plane of symmetry of the piping, said transducers being oriented in a measuring direction forming an angle which is not zero and is less than 90° with the longitudinal axis of the piping, characterised in that each transducer is installed in a mounting device having any one of the above features.

Advantageously and in accordance with a second embodiment of the invention, the mounting device is adapted to be mounted on a flowmeter comprising piping having a flow-calming chamber at each end thereof, each chamber having an ultrasonic transducer mounted such that the transmitting/receiving direction of the transducer merges with the longitudinal axis of said piping. The mounting device is arranged such that the transducer associated with each device faces the other transducer on the axis of the flow of the fluid when the mounting device is installed in the flowmeter.

Advantageously and in accordance with the invention, the active surface of the body of the device forms at least part of the wall of the flow-calming chamber. Therefore, irrespective of the shape of the flow-calming chamber, the body of the mounting device forms a plug closing an aperture of the chamber through which the transducer is introduced, this plug being continuous in shape with the flow-calming chamber, at least around the contour line of the interface between the plug and the chamber.

Advantageously and in accordance with the invention, the active surface of the body of the device forms a segment, of which the contour line is at least partially contained in a plane of symmetry of the flow-calming chamber passing through the axis of the piping. Therefore, irrespective of whether the flow-calming chamber is spherical, barrel-shaped or in the form of two cones connected at their base by a cylinder of revolution, the recessed shape of the chamber can be produced in two parts, having a substantially identical and complementary shape and size, which allows the machining and/or moulding of such shapes to be simplified, or even to be rendered possible.

Advantageously and in accordance with the invention, the active surface likewise forms a hollow, at least substantially cylindrical, enclosure, named plunger, extending radially protruding in the direction of the longitudinal axis of the piping and having a length adapted to cut this axis. The plunger thus allows the ultrasonic transducer to be installed within the enclosure on the longitudinal axis of the piping facing another transducer installed in a symmetrical mounting device in the opposite flow-calming chamber.

Advantageously and in accordance with the invention, the plunger has, at least on an inner face of the hollow enclosure, a flat orthogonal to the longitudinal axis of the piping adapted to form a supporting wall for the ultrasonic transducer. Therefore, the transducer can be mounted within the plunger in a predetermined orientation and can be connected by electrical connections to the exterior of the flow-calming chamber.

The invention likewise relates to an ultrasonic flowmeter of the type comprising piping for measuring the flow rate of a fluid, said piping having a flow-calming chamber at each end, each chamber having an ultrasonic transducer mounted facing the transducer of the other chamber on a longitudinal axis of said piping, characterised in that each transducer is installed in a mounting device according to any one of the features of the second embodiment of the invention.

The invention likewise relates to a device for mounting an ultrasonic transducer and an ultrasonic flowmeter, which are characterised in combination by all or some of the features mentioned above or below.

Figure 2:
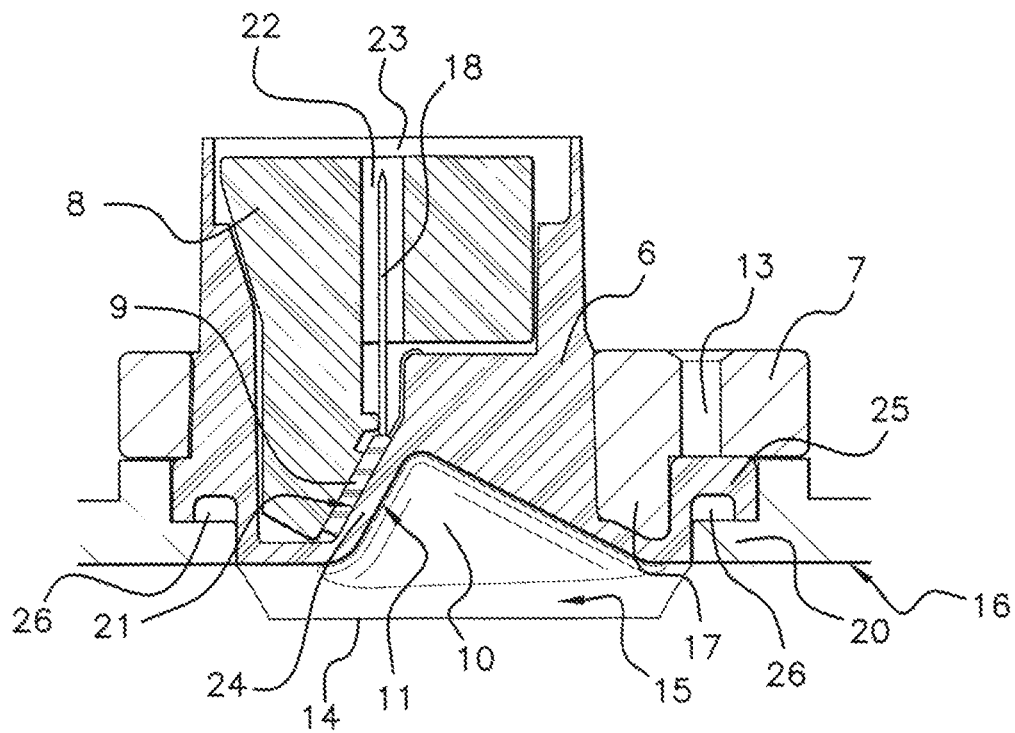
Figure 3:
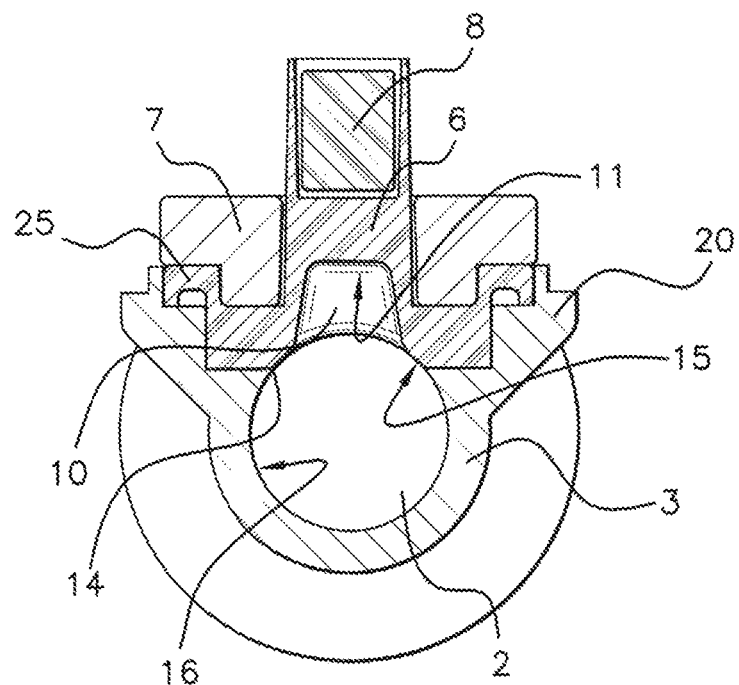
Figure 4:
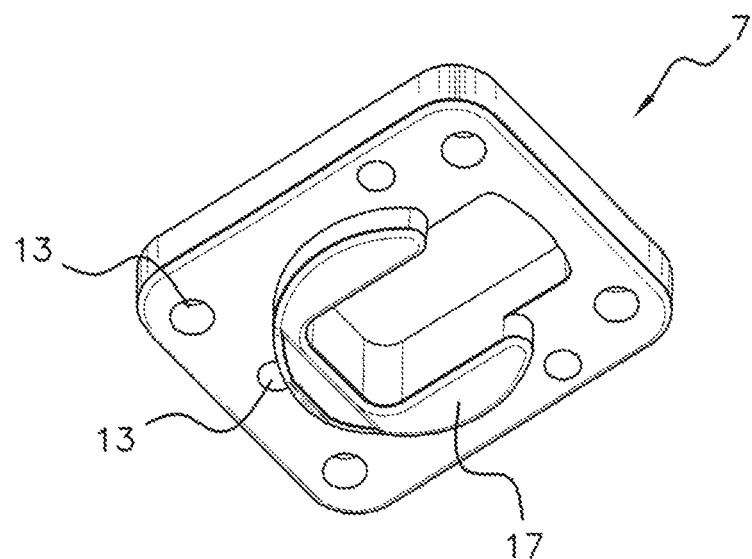
Figure 5:
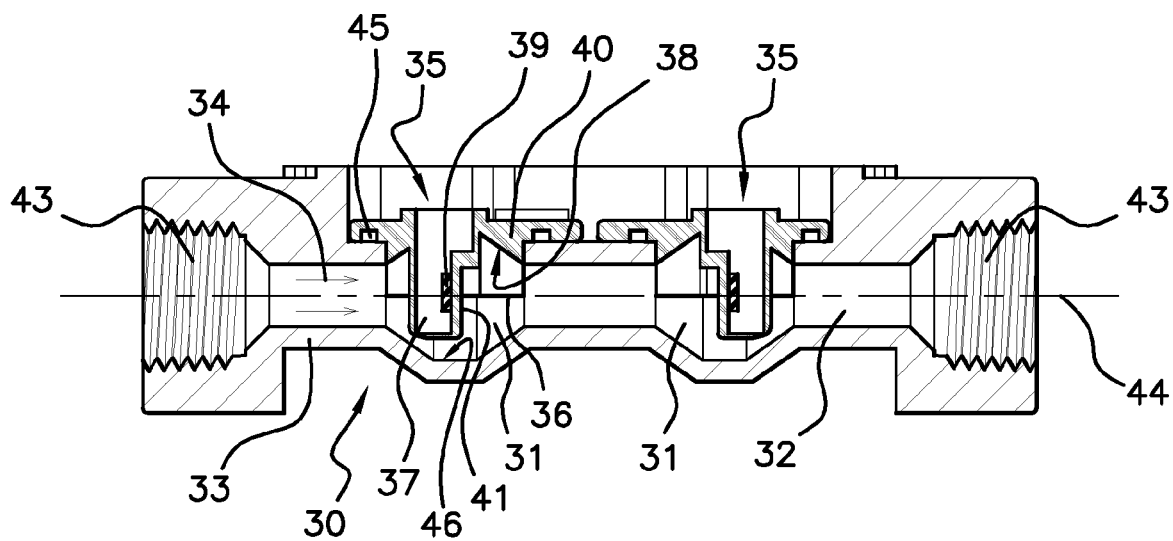
Figure 6:
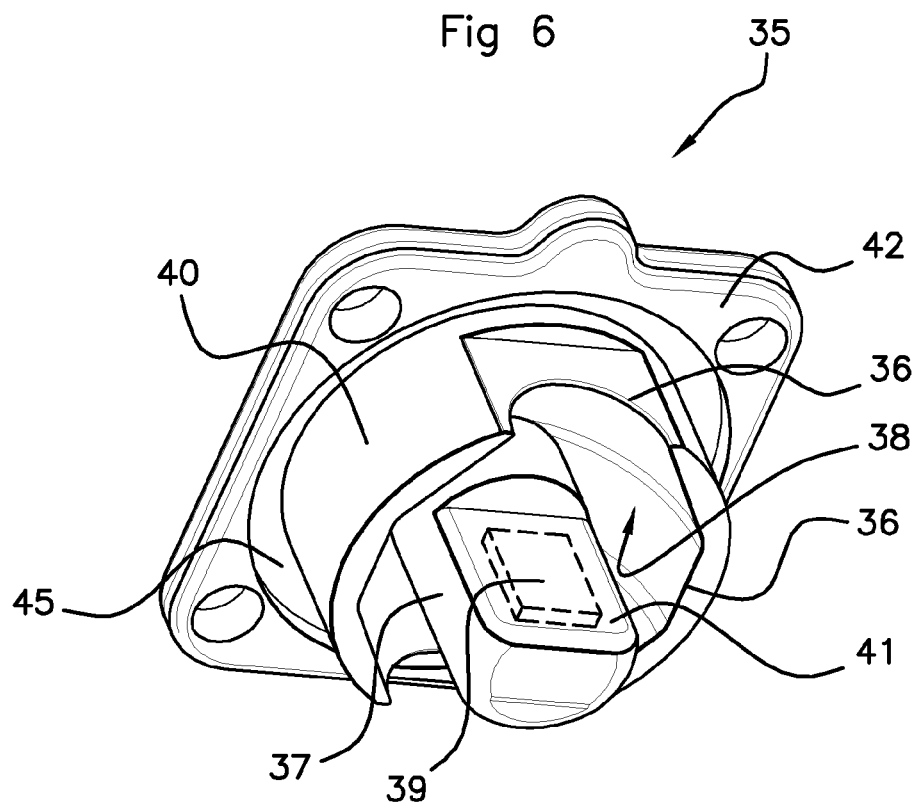

Other aims, features and advantages of the invention will become apparent in view of the following description and the accompanying drawings, in which:

FIG. 1 is a longitudinal cross-sectional view of a flowmeter in accordance with a first embodiment of the invention, FIG. 2 is a longitudinal cross-sectional view of a mounting device in accordance with the first embodiment of the invention, FIG. 3 is a transverse cross-sectional view of a mounting device and of a flowmeter at the line AA of FIG. 1, FIG. 4 is a perspective view of the lower face of a flange of a mounting device in accordance with the first embodiment of the invention, FIG. 5 is a cross-sectional view of a flowmeter in accordance with the second embodiment of the invention, provided with suitable mounting devices, FIG. 6 is a perspective view of a mounting device in accordance with the second embodiment of the invention.

FIG. 1 shows a longitudinal cross-sectional view of a flowmeter 1 comprising a tube 3 forming piping 2 in which a fluid flows for which the flow rate is to be measured. In the illustrated example, the piping 2 is in the shape of a cylinder of revolution and has a longitudinal axis 4. The tube 3 has two plates 20 (FIG. 3) moulded or machined on the tube and diametrically opposite with respect thereto and spaced apart from each other on the longitudinal axis of the piping. Each plate 20 comprises an aperture issuing into the piping 2. A device 5 for mounting an ultrasonic transducer 9 is installed in the aperture of each plate 20 and fixed to the tube 3.

The mounting device 5 illustrated in more details in FIGS. 2 and 3 has a body 6 formed of a single piece, preferably moulded in synthetic material, e.g. in polyetherimide (PEI) for its temperature stability, the shape of which is at least partly conjugate to that of the aperture so as to be able to be fixed thereto. Once installed in the aperture, the body 6 has a surface, named active surface 15, in contact with the fluid 19 flowing in the piping. The inner surface 16 of the piping and the active surface 15 of the body 6 are delimited by a closed line, named contour line 14.

The active surface 15 is the only part of the mounting device 5 in contact with the fluid. It extends continuously—without an opening—over the entire area delimited by the contour line 14.

In order to avoid disruptions to the fluid 19 at the interface between the inner surface 16 of the piping and the active surface 15 of the body 6 of the mounting device, these two surfaces are continuous with each other at least close to the contour line 14. Therefore, the active surface 15 is such that any tangent to the inner surface 16 of the piping along the contour line 14 and orthogonal thereto is likewise tangential to the active surface 15. In this manner, the interface between the two surfaces is perfectly smooth and cannot cause discontinuities in the fluid flow paths, turbulence or even stagnation zones for the fluid. For example for cylindrical piping, the active surface of the body of the mounting device 5 is likewise cylindrical and has the same radius, at least close to the contour line as shown in FIG. 3.

In a flowmeter 1 as shown in FIG. 1, two ultrasonic transducers 9 are installed facing each other in the piping 2 in a measuring direction 12 forming a predetermined angle which is not zero and is less than 90° with the longitudinal axis 4 in a longitudinal plane of symmetry of the piping. Preferably, the angle between the measuring direction 12 and the longitudinal axis 4 of the piping is of the order of 30° but can be up to 50° or even more depending upon the types of flowmeter.

Each transducer 9 is formed of a plate of piezoelectric material comprising two electrodes and protected by an external coating of synthetic material in the shape of a greatly flattened parallelepiped. The main faces of the transducer are orthogonal to the transmitting/receiving direction of the ultrasonic waves. Each transducer 9 is mounted in a mounting device 5 passing through the tube 3 and issuing into the piping 2. The mounting devices 5 are placed on either side of the tube 3 such that the transducers 9 are placed facing each other and their respective transmitting/receiving direction coincides with the measuring direction 12.

Owing to the continuity of the active surface, the transducer 9 is isolated from the fluid flowing in the piping. It is thus possible to directly use a plate of piezoelectric material without external coating in place of the coated transducer 9. As will be described hereinafter, the piezoelectric plate can be fixed in the body 6 by a layer of adhesive or resin partly allowing the aural impedance between the piezoelectric plate and the fluid to be adapted. Consequently, the body 6 and the plate of the transducer together form at least part of an integrated transducer.

In order to orientate the transducer 9 in the measuring direction, the body 6 comprises, on its active surface 15, a countersunk recess 10, the concavity of which is oriented towards the interior of the piping 2, i.e. in the direction of the longitudinal axis 4. This recess 10 extends in a longitudinal direction in parallel with the longitudinal axis 4 of the piping and has at least one planar face, named active face 11, orthogonal to the measuring direction 12. The other walls of the recess 10 can have any shape so long as these walls do not interfere with the ultrasonic waves. For example, the recess 10 comprises, as shown in detail in FIG. 2, an upper face in parallel with the measuring direction 12 and two lateral faces in parallel with the longitudinal plane of symmetry of the piping containing the measuring direction 12.

In order to prevent the recess 10 from forming a source of disruptions to the fluid flow or stagnation zones thereof, any plane orthogonal to the longitudinal direction of the recess (or orthogonal to the longitudinal axis 4 of the piping) cuts the active surface 15 only in a single line, i.e. the profile of the recess, in longitudinal cross-section, has no flow turn-around or flow return with respect to the flow direction of the fluid. In practice, the profile of the recess does not comprise any acute angle which could form a zone of discontinuity in the fluid flow paths or a dead zone in which the fluid might stagnate.

Furthermore, the active surface 15 and all the faces of the recess 10 which is provided therein are connected to each other and to the contour line 14 by surfaces free of sharp edges. For example, all the planar surfaces are connected to each other by radius fillets sufficient to not create turbulence in the fluid flow paths. For example, for a recess having a depth of 10 to 15 mm, the radii of the fillets are of the order of 0.5 to 1 mm.

However, in some cases, the fluid flow can vary greatly, causing transitions between various flow states, e.g. a laminar flow state to a turbulent flow state depending upon the fluid flow rate. It is thus useful to provide some raised areas at predetermined locations on the active surface 15, e.g. close the active face 11, so as to generate disruptions associated with these flow state changes. Thus, striations in parallel with the direction of the flow of the fluid can be provided at the junction between the active face 11 and the active surface 15 upstream of the active face with respect to the flow of the fluid, so as to straighten out the direction of the fluid flow paths. Other geometric shapes, e.g. fins, can be used at various locations on the active surface in order to correct anomalies in the fluid flow in some fluid states. These shapes can advantageously be formed when moulding the body 6.

Opposite the recess 10, the body 6 comprises a housing 23 which is open towards the outside, i.e. its concavity is oriented opposite the axis 4. This housing comprises a planar face, named supporting face 21, in parallel with the active face 11 of the recess 10 and delimiting therewith a partition 24 on which the transducer 9 is fixed. The housing 23 receives a stopper 8 having a shape adapted to substantially fill the housing 23, the stopper 8 having a face to be used to place the transducer 9 against the supporting face 21. The stopper 8 is fixed in the housing 23 of the body 6 by any suitable fixing means, e.g. screwing, clipping, welding, adhering or snap riveting. The stopper 8 is produced from synthetic material, preferably identical or compatible with that of the body 6 and has one or more dimples 22 adapted to receive means for electrically contacting the transducer 9 such as connector pins 18 which pass through the stopper and come into contact with the pins of the transducer 9. When the transducer 9 is simply a naked piezoelectric plate, this plate is adhered to the supporting face 21 by the adhesive or a suitable resin (suitable for adaptation of the aural impedance) and plated against this supporting face by the stopper 8 which forms a connector. Consequently, the body 6, the piezoelectric plate and the stopper form an integral unit considered to be an integrated transducer.

The body 6 further comprises a lip 25 adapted to abut against the plate 20 completely around the aperture provided in this plate. On its periphery, the lip 25 comprises a groove adapted to receive a gasket 26 between the lip 25 and the plate 20.

Advantageously, the orientation of the transducer 9 in the measuring direction 12 is ensured by the inclination of the partition 24 and of the supporting face 21 and active face 11. Consequently, it is possible to choose to insert the mounting device 5 and thus the body 6 in the tube 3 in any direction. Preferably, the mounting device 5 is adapted to be mounted on the tube 3 in a radial direction with respect thereto, i.e. orthogonal to the longitudinal axis 4. Consequently, the lip 25 and the plate 20 can be in parallel with and orthogonal to the mounting direction, which simplifies the machining of the mounting aperture in the tube 3 as well as the steps of assembly.

Finally, the mounting device 5 comprises a flange 7 allowing the body 6 to be fixed to the plate 20 using screws (not shown) passing into bores 13. The flange 7 comprises a central lumen allowing the passage of the top part of the body 6 such that the stopper 8 and the connections 18 are accessible from the outside once the mounting device 5 is in position on the tube 3. FIG. 4 shows a perspective view of the flange 7 from below, showing the presence of a protruding U-clamp 17 on the lower face of the flange 7, adapted to co-operate with a conjugate profile provided in the body 6 so as to facilitate orientation thereof on the axis of the tube 3 and to reinforce the stiffness of the body 6, particularly in the case where the fluid flowing in the piping is under high pressure. The flange 7 can be produced from synthetic material, possibly with a filler of glass or carbon fibres to improve the stiffness thereof, or even from metal, preferably stainless steel. Of course, the flange 7 can likewise be fixedly attached to the body 6, e.g. simultaneously moulded in a single piece.

Reference is now made to FIGS. 5 and 6 which show a second embodiment of a flowmeter in accordance with the invention. The flowmeter 30 is in the general shape of a tube 33 terminated by threaded connections 43 at the two ends. Between the connections 43, a fluid 34 passes through the piping 32 which has three tubular sections separated by two flow-calming chambers 31 located on either side of the central tubular section. Two ultrasonic transducers 39 are placed facing each other on either side of the central tubular section on a longitudinal axis 44 of the piping 32 within the chambers 31.

In the illustrated example, each chamber 31 has a profile in the shape of two frustums separated by a cylindrical section, these three parts being coaxial to each other and to the longitudinal axis 44 of the tubular sections. The minor base of each frustum has a diameter equal to the diameter of the piping and the major base of each frustum has a diameter equal to that of the cylindrical section. Such a piping shape would be very difficult, if not impossible, to achieve without providing a removable portion. This is likewise true e.g. for a chamber of spherical or quasi-spherical shape.

In order to facilitate, or even render possible, the production of a flowmeter of this type, each chamber 31 is formed of two parts, a first part obtained from the tube 33 and a second part formed from the body 40 of a mounting device 35 of the transducer 39. The two parts of the chamber 31 meet along a contour line 36. In order to minimise the generation of turbulence in the flow of the fluid 34 close to this contour line, the inner surface of the part of the chamber 31 originating from the tube 33 and the surface, named active surface 38, of the part of the chamber originating from the mounting device 35 in contact with the fluid are such that, along the contour line 36, a straight line tangential to one of the surfaces, orthogonal to the contour line, is likewise tangential to the other surface. Therefore, the active surface 38 of the mounting device 35 forms a surface continuity with the tube 33 to form the flow-calming chamber.

Preferably, in the chamber 31, the active surface 38 forms a segment symmetrical with respect to the inner surface of the tube 33 and the contour line 36 belongs at least in part to the plane of symmetry passing through the longitudinal axis 44 of the piping 32. The flow-calming chamber 31 is thus formed of two half-shells of substantially the same size.

In its active surface, the mounting device 35 likewise comprises a hollow enclosure, named plunger 37, of generally cylindrical shape and having an axis orthogonal to the longitudinal axis 44 of the piping. This plunger 37 comprises an axial opening to the outside of the piping 32 adapted to allow insertion and fixing of a transducer 39 such that the transmitting/receiving direction of this transducer coincides with the longitudinal axis of the piping. To this end, the plunger 37 comprises, at least on its inner surface, a flat 41 orthogonal to the longitudinal axis of the piping. Preferably, the flat 41 is formed on the inner and outer surfaces of the plunger. The transducer 39 can thus be fixed, e.g. by adhesion, to the inner face of the flat 41, sheltered from the fluid. The interior of the plunger can then be closed by casting with a resin. Alternatively, the transducer 39 can be fixed to a stopper (not shown) having a shape conjugate to that of the interior of the plunger, this stopper then being inserted into the plunger 37.

The body 40 of the mounting device 35 has a substantially cylindrical outer surface, with an axis orthogonal to the longitudinal axis 44 of the piping and a diameter adapted to co-operate with a mounting aperture provided in the tube 33. It is thus possible to radially insert the mounting device 35 in the tube 32.

The body 40 further has a flange 42 mounted thereon, said flange being adapted to fix the mounting device 35 to the tube 32. The flange 42 has, at the periphery of the body 40, a groove 45 adapted to receive a gasket.

Advantageously, the mounting device 35 is produced from a single piece by moulding in synthetic material, which allows precise and particularly economical production.

The flowmeter 30 can thus be formed of a tube 33 and two identical mounting devices 35, each provided with a transducer 39 and mounted facing each other on either side of a central tubular section of the piping, each mounting device 35 complementing the tube 33 to form a flow-calming chamber 31.

Of course, this description is given by way of an illustrative example only and a person skilled in the art could make numerous modifications thereto without departing from the scope of the invention, such as e.g., in the first embodiment, replacing the recess 10 by a protrusion in the fluid flow or making provision to mount the transducer 9 in a protrusion on the active face 11, this protrusion remaining in the space inside the recess 10, or even, in the second embodiment, making provision to mould the two mounting devices 35 as a single piece.

The invention claimed is:

1. Device for mounting an ultrasonic transducer adapted for mounting said transducer through a wall of a flowmeter having piping within which a fluid flows, said device having a body adapted to emerge onto an inner surface of said piping via an aperture according to a contour line forming an interface between said inner surface of the piping and a surface of the body, this interface being such that any straight line orthogonal to the contour line and tangential to the inner surface of the piping at a point of the contour line is likewise tangential to said surface of the body at this point, wherein the device has a surface, named active surface, in contact with the fluid flowing in the piping, and wherein this active surface is formed by said surface of the body in contact with the fluid flowing in the piping, extends continuously, without a hole, cut, opening or discontinuity, and wherein the transducer is mounted in the body, isolated from the fluid flowing in the piping owing to the continuity of the active surface.

2. Device according to claim 1, wherein said active surface is at least partially formed by a wall of the body having a supporting face bearing the transducer opposite the active surface.

3. Device according to claim 2, wherein the active face is in parallel with the supporting face.

4. Device according to claim 2, wherein the body of the device has, at right angles to the supporting face, an open housing having a concavity oriented opposite the longitudinal axis of the piping.

5. Device according to claim 4, further comprising a stopper adapted to co-operate with said housing so as to place the ultrasonic transducer against the supporting face.

6. Device according to claim 1, wherein said active surface is free of sharp edges.

7. Device according to claim 1, wherein the transducer is mounted in the body so as to have an ultrasound-transmitting/receiving direction passing through a planar face, named active face, of the active surface.

8. Device according to claim 7, constructed and arranged for orienting the transmitting/receiving direction of the transducer in a direction, named measuring direction, adapted for extending in a plane of longitudinal symmetry of the piping and for forming a predetermined angle with a longitudinal axis thereof.

9. Device according to claim 7, wherein the active surface has, close to said active face, raised areas adapted to modify a flow of the fluid.

10. Device according to claim 1, wherein said active surface has a countersunk recess extending in a longitudinal direction, adapted to be in parallel with a longitudinal axis of the piping when the mounting device is mounted thereon.

11. Device according to claim 10, wherein the profile of the recess is such that any plane orthogonal to this longitudinal direction cuts the active surface in a single line.

12. Device according to claim 1, wherein the device is adapted to be mounted in the piping in a direction orthogonal to a longitudinal axis thereof.

13. Device according to claim 1, further comprising a flange adapted to fix the body to said piping, said flange having, facing the body, a protrusion in the form of a U-clamp adapted to co-operate with a conjugate shape of the body so as to stiffen the body.

14. Device according to claim 1, constructed and arranged to be mounted on a flowmeter comprising piping having a flow-calming chamber at each end thereof, each chamber having an ultrasonic transducer mounted such that the transmitting/receiving direction of the transducer merges with the longitudinal axis of said piping.

15. Device according to claim 14, wherein the active surface of the body of the device forms at least part of the wall of the flow-calming chamber.

16. Device according to claim 15, wherein the active surface of the body of the device forms a segment, of which the contour line is at least partially contained in a plane of symmetry of the flow-calming chamber passing through the axis of the piping.

17. Device according to claim 14, wherein the active surface likewise forms a hollow, at least substantially cylindrical, enclosure, named plunger, extending radially protruding in the direction of the longitudinal axis of the piping and having a length adapted to cut this axis.

18. Device according to claim 17, wherein the plunger has, at least on an inner face of the hollow enclosure, a flat orthogonal to the longitudinal axis of the piping adapted to form a supporting wall for the ultrasonic transducer.

19. Ultrasonic flowmeter comprising piping for measuring the flow rate of a fluid, said piping having a flow-calming chamber at each end, each chamber having an ultrasonic transducer installed in a mounting device according to claim 14 and mounted facing the transducer of the other chamber on a longitudinal axis of said piping.

20. Ultrasonic flowmeter comprising piping for measuring the flow rate of a fluid and at least two ultrasonic transducers installed in a mounting device according to claim 1, said transducers being mounted facing each other through a wall of said piping in a single longitudinal plane of symmetry of the piping, said transducers being oriented in a measuring direction forming an angle which is not zero and is less than 90° with a longitudinal axis of the piping.

* * * * *